Nov. 21, 1967  R. R. AMBROGI ET AL  3,353,942
METHOD AND APPARATUS FOR PRESSING THERMOPLASTIC MATERIALS
Filed Oct. 8, 1964
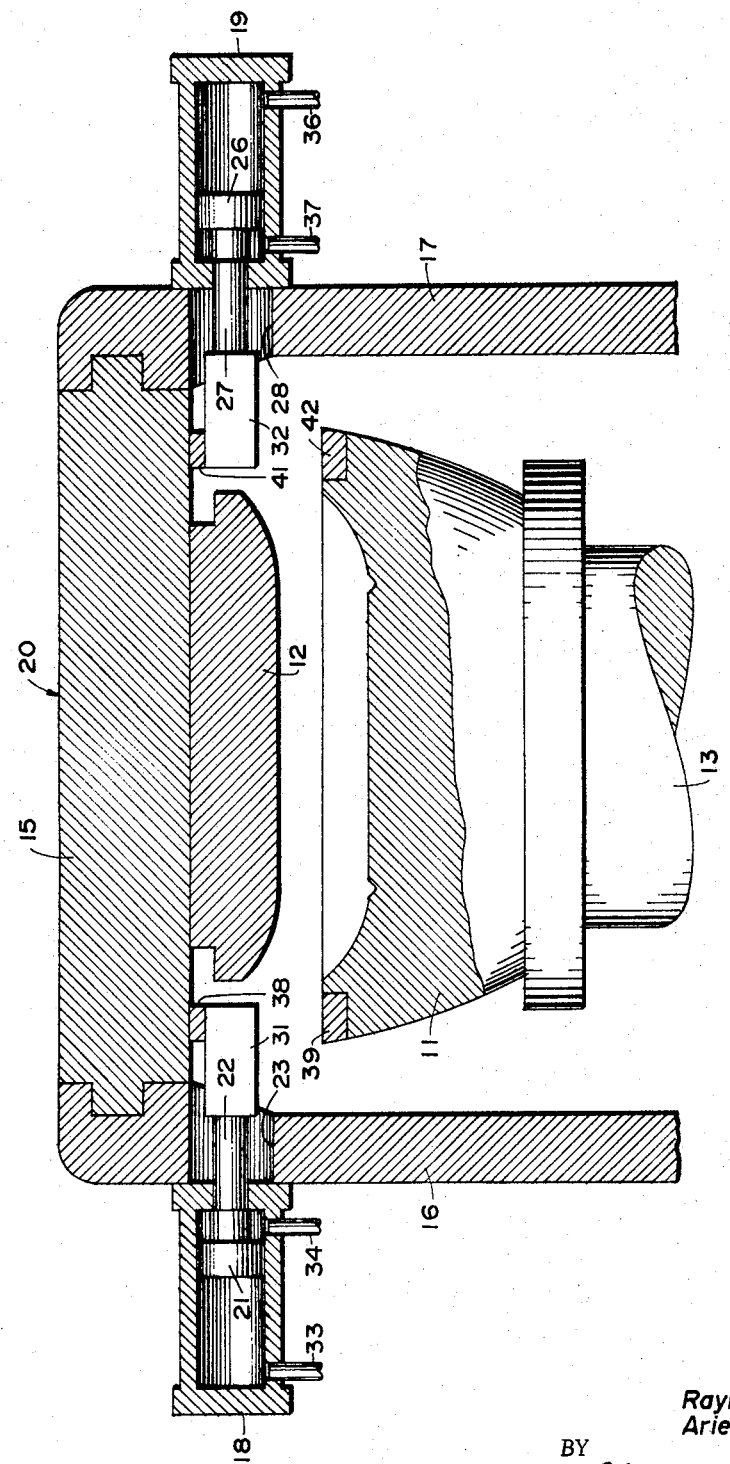
INVENTORS
Raymond R. Ambrogi
Arieh Carmi
BY
Clarence R. Patty Jr.
ATTORNEY

United States Patent Office 3,353,942
Patented Nov. 21, 1967

3,353,942
METHOD AND APPARATUS FOR PRESSING THERMOPLASTIC MATERIALS
Raymond R. Ambrogi and Arieh Carmi, Corning, N.Y., assignors to Corning Glass Works, Corning, N.Y., a corporation of New York
Filed Oct. 8, 1964, Ser. No. 402,485
7 Claims. (Cl. 65—68)

This invention relates to the pressing of articles of thermoplastic materials. More specifically the invention relates to a method of and apparatus for free pressing articles of molten thermoplastic materials such as glass-making compositions.

In the so-called free pressing of articles of a molten thermoplastic material such as, for example, glass tableware articles, the neck-ring mold otherwise employed is dispensed with, and gobs of molten glass are individually supplied to a press mold and pressed therein by a cooperating plunger, the volume of the gob supplied to the press mold being less than the volume of the cavity formed between the pressing surfaces of said mold and plunger when such plunger is disposed within such mold to its most extreme glass pressing position. The control of dimensions when employing such technique of free pressing depends on control of many variables, such as, the pressure applied while pressing, the time period of pressure application, the gob weight or volume; the gob temperature and composition, and the associated viscosity of the gob; the mold and plunger contour, and the temperature of such glass-forming members.

One method of free pressing glassware or articles in which dimensional control is not dependent on control of so many variables, is disclosed in Letters Patent of the United States 1,812,564, issued June 30, 1931 to Theodore H. Sloan for Method of Pressing Glassware. In the method disclosed in such patent, a plurality of downwardly extending stops or legs are provided about the edge of a glass-forming plunger, the bottom of such legs coming to rest upon a ledge of the cooperating press mold, during a pressing operation, to limit the movement of the glass-contacting face of the plunger to within a definite distance from the glass-contacting face of the mold. A gob of glass previously supplied to the center of the mold is, therefore, pressed and spread outwardly until said legs or stops contact said ledge and prevent further pressing thereof. As in the previously mentioned free pressing techniques, the volume of the glass gob is less than the volume of the glass-forming cavity, the limits of which are defined by said legs or stops and, therefore, no neck-ring mold need be employed to confine the outwardly spread peripheral edge of the pressed article to a preselected limit.

While the free pressing of glass articles by the method disclosed in said Sloan patent is satisfactory for articles of ordinary quality and value, it has been found that such method is not suitable to the free pressing of high quality articles, such as articles of dinnerware formed from the relatively new glass-ceramic compositions. The objections to such method in the pressing of such high quality articles is that, during cooling, contraction of the glass takes place and, since contact is not maintained between glass, mold and plunger because of such contraction, objectional ripples are caused in one or more surfaces of the formed glass article and the contour imparted thereto by the pressing operation is not maintained.

It is, accordingly, one object of the present invention to provide a novel method of free pressing high quality articles of a thermoplastic material such as a glass-ceramic composition.

It is another object of the invention to provide a novel method of free pressing glass articles while accurately controlling the finished dimensions thereof.

It is a third object of the invention to provide a novel method of free pressing in which dimensional control is dependent on control of a minimum number of variables.

It is another object of the invention to provide a method of free pressing of glass articles in which dimensional control is substantially dependent on gob weight or volume only.

In accomplishing the above objects of the invention, the steps employed comprise, the pressing of a measured molten gob of thermoplastic material, such as a glass-making composition, within a cavity formed between a press mold and cooperating pressing plunger, the volume of such cavity being defined by means of a plurality of removable stops which limit, during a glass pressing operation, the extent of projection of the glass forming surface of said plunger within the hollow of said mold; subsequently reducing the pressing force and removing said stops; and thereafter maintaining contact between the glass forming surfaces of said plunger and mold, and the pressed surfaces of said gob, until the article formed by the pressing of such gob sufficiently cools.

Other objects and characteristic features of the invention will become apparent as the description proceeds.

The single drawing figure comprises an elevational view, substantially in cross-section, of one form of apparatus which may be used in practicing the invention.

Referring to the single drawing figure, there is illustrated a glass press of the type in which the mold 11 is moved upwardly towards a cooperating glass forming plunger assembly 20, including a cross-beam support 15 and a plunger 12, to press a gob of glass previously supplied to mold 11. The movement of the mold and the pressing pressure applied to the gob by the upward movement of the mold is supplied by the ram or piston rod 13 of a fluid pressure cylinder, such cylinder not being shown in the drawing for purposes of simplification thereof and such pressing apparatus being well known to those skilled in the art.

Cross-beam support 15 of plunger assembly 20 is stationarily supported above the path of movement of mold 11 by two uprights 16 and 17, and plunger 12 is secured, in any convenient manner, to the bottom of support 15 in a depending fashion and so that it is surrounded by the concave gob receiving portion of mold 11 when such mold is moved upwardly by piston rod 13. It will be readily understood that the bottom of uprights 16 and 17 are immovably secured to a table or base (not shown) so that plunger 12 is always located in a predetermined stationary relationship with respect to the actuating cylinder for ram or piston rod 13.

First and second motor means such as fluid pressure cylinders 18 and 19 are secured in opposite locations, in any convenient manner, as for example by welding, to the outer sides of uprights 16 and 17, respectively. Cylinder 18 includes piston 21 to which is connected a first end of a piston rod 22 the second end of which extends through an orifice 23 provided through upright 16. Similarly, cylinder 19 includes a piston 26 to which is connected a first end of a piston rod 27, the second end of which extends through an orifice 28 provided through upright 17. The second ends of the piston rods 22 and 27 are each provided with a member of relatively hard material and designated 31 and 32, respectively. Such members, as hereinafter discussed, act as removable stops which limit the extent of pressing of a gob of molten thermoplastic material supplied to mold 11. That is, such members defines the vertical limits of the glass pressing cavity formed between mold 11 and plunger 12 during a glass pressing operation. This will become more apparent hereinafter in the description.

Motor means or cylinder 18 is provided with first and second fluid pressure conduits 33 and 34, respectively, through which fluid under pressure may be internally supplied to first and second ends of such cylinder. Simimlarly, motor means or cylinder 19 is provided with first and second fluid pressure conduits 36 and 37, respectively, through which fluid under pressure may be internally supplied to first and second ends of that cylinder. It will be apparent, therefore, that members or stops 31 and 32 may be extended to or retracted from their stop positions according as pressurized fluid is supplied to conduits 33 and 36, or conduits 34 and 37, respectively.

There is shown on the underside of cross beam support 15 and the upper part of the outer edge of mold 11, at the left hand sides thereof, complemental wear plates 38 and 49, respectively, of a relatively hard material. There is also similarly shown on the under side of cross beam support 15 and the upper part of the outer edge of mold 11, at the right hand sides thereof, wear plates 41 and 42, respectively, also of a relatively hard material. Such wear plates may be attached to their respective parts in any convenient manner and are provided, as is readily apparent, to provide replaceable wearing surfaces for movable members or stops 31 and 32.

In practicing the invention herein disclosed a molten gob of a thermoplastic material, such as a glass making composition, having a predetermined volume or weight is supplied to the center of mold 13, and members or stops 31 and 32 are actuated to their positions shown in the drawing by supplying pressurized fluid to conduits 33 and 36 of cylinders 18 and 19. Thereafter mold 11 is actuated in its upward direction by ram or piston rod 13, and the gob previously supplied to mold 11 is pressed between plunger 12 and such mold until wear plates 39 and 42 firmly contact stops 31 and 32, respectively, and force them into firm contact against wear plates 38 and 41, respectively. Said gob supplied to mold 11, as previously mentioned, has a volume less than the glass pressing cavity so formed between mold 11 and plunger 12 and, therefore, such gob is forced outwardly from the center of the mold only until the vertical limits of said cavity, defined or established by stops 31 and 32, are attained. After the desired configuration is thus imparted to the pressed gob by mold 11 and plunger 12, the pressing pressure supplied by ram or piston rod 13 is reduced to a value such that the glass contacting surfaces of the mold and plunger will only be maintained in continuous contact with the formed surfaces of the glass article pressed from said gob. Pressurized fluid is then supplied to conduits 34 and 37 of the respective cylinders 18 and 19, and stops 31 and 32 are thus retracted and removed from between their respective wear plates. As the formed glass article then further cools and contacts, said reduced pressure maintains said glass contacting surfaces in contact with the pressed surfaces of said article without further pressing thereof, and thereby prevents crinkles or ripples of such surfaces and maintains the contour imparted to the article. After the formed configuration imparted to said article is sufficiently "sealed in" by the cooling thereof, all forming pressure is released and ram or piston rod 13 is actuated to retract mold 11 away from plunger 12. The formed article is thereafter removed from mold 11 and such mold is then in condition to receive another molten gob of the same volume or weight as the preceding one, and stops 31 and 32 can then be again actuated to their extended positions in the manner previously discussed.

Broadly, the invention method herein disclosed thus comprises the steps of supplying a molten gob of thermoplastic material to a press mold, inserting a plurality of removable members or stops between parts of such mold and its cooperating plunger to define the vertical limits of a cavity for pressing said gob, pressing said gob with a pressure having a value sufficient to cause said mold and plunger parts to contact opposite surfaces of said stops, thereafter reducing said pressure to a value sufficient to maintain the glass contacting surfaces of said mold and plunger in contact with the formed surfaces of said gob without further pressing thereof following removal of said stops, and then removing said stops from between said parts to permit said reduced value of pressure to maintain the glass forming surfaces of said mold and plunger in contact with said surfaces of said gob and provide cooling thereof.

It is pointed out that the invention disclosed herein may be practiced in conjunction with a glass pressing apparatus wherein the plunger is moved toward a stationary mold as well as with the type illustrated in the drawing. Furthermore, a single removable stop, or a plurality of three or more such stops, rather than two as illustrated in the drawing, may be used in actual practice of the invention, and the stops may be provided at other locations than that shown to define the vertical limits of the glass forming cavity between the mold and cooperating plunger. In addition the motor means used for actuating the stops may be other than the pressurized fluid actuated type, as for example, electrically actuated solenoid motors.

Although the practice of the inventive method disclosed herein is described in conjunction with a specific type of glass pressing apparatus, such description is not intended to be in any way limiting but it is to be understood that the desired exclusive rights sought are to be limited only by the spirit and scope of the appended claims.

What is claimed is:

1. The method of pressing an article of a thermoplastic material between a press mold and cooperating plunger of a plunger assembly, such method comprising, supplying a molten gob of said material to said mold; inserting a plurality of removable members between parts of said mold and plunger assembly to define an article forming cavity of a desired vertical dimension during a pressing operation, said gob having a volume less than such cavity; pressing said gob between said mold and plunger with sufficient pressure to cause said mold and plunger assembly parts to contact said removable members, such pressing imparting a desired configuration to such gob; thereafter reducing said pressure and removing said members from between said mold and plunger assembly parts; and then applying to the formed gob, by said mold and plunger, pressure sufficient only to maintain, during the cooling of the gob, said desired configuration imparted thereto.

2. The method in accordance with claim 1 in which said molten gob of material comprises a glass-making composition.

3. The method of free pressing an article of thermoplastic material in a cavity formed between a press mold and cooperating plunger of a plunger assembly during a pressing operation, such method comprising, supplying a molten gob of said material to said mold; inserting removable stops between parts of said mold and plunger assembly to define vertical limits for said cavity, said gob having a volume less than such cavity; pressing said gob until said mold and plunger assembly parts firmly contact said stops, thereby forming a pressed article; reducing the pressing pressure to release said stops, removing said stops from between said mold and plunger assembly parts; and applying pressing pressure sufficient only to continously maintain the glass forming surfaces of said mold and plunger in contact with the pressed surfaces of the formed article, whereby the pressed-in configuration of the article is maintained while the article is cooled by the removal of heat therefrom by the mold and plunger.

4. The method in accordance with claim 3 wherein said thermoplastic material is a glass-making material.

5. The method of free pressing an article of thermoplastic material in a cavity formed between a press mold and cooperating plunger during a pressing operation, such method comprising, supplying a molten gob of said material to said mold; inserting at least one removable stop between parts of said mold and plunger to define vertical limits for said cavity, said gob having a volume less than such cavity; pressing said gob with sufficient pressure to cause said mold and plunger parts to contact said stop; and thereafter reducing the pressing pressure to a value sufficient only to continuously maintain the glass contacting surfaces of said mold and plunger in contact with the pressed surfaces of said gob following the removal of said stop, and then removing such stop.

6. In an apparatus for free pressing articles of a thermoplastic material and including a press mold and cooperating plunger assembly, the combination comprising, at least one movable stop insertable between parts of said mold and plunger assembly for defining vertical limits for the pressing space therebetween, and motor means connected to each stop for actuating such stop to and from a position of insertion between said mold and plunger assembly parts.

7. Apparatus in accordance with claim 6 in which said motor means comprises at least one fluid actuated piston motor.

References Cited

UNITED STATES PATENTS

| | | | |
|---|---|---|---|
| 690,119 | 12/1901 | O'Neill | 65—357 X |
| 1,578,448 | 3/1926 | Lebby | 65—68 |
| 1,712,233 | 5/1929 | Slick | 65—305 X |
| 3,185,560 | 5/1965 | Wilcock | 65—318 X |

FOREIGN PATENTS

| | | |
|---|---|---|
| 101,166 | 3/1941 | Sweden. |

DONALL H. SYLVESTER, *Primary Examiner.*

F. W. MIGA, *Assistant Examiner.*